United States Patent [19]
Brief et al.

[11] Patent Number: 6,122,676
[45] Date of Patent: Sep. 19, 2000

[54] APPARATUS AND METHOD FOR TRANSMITTING AND RECEIVING DATA INTO AND OUT OF A UNIVERSAL SERIAL BUS DEVICE

[75] Inventors: David Brief, Ra'anana, Israel; Gregory Lewis Dean, Standish, Me.

[73] Assignee: National Semiconductor Corporation, Santa Clara, Calif.

[21] Appl. No.: 09/004,004

[22] Filed: Jan. 7, 1998

[51] Int. Cl.[7] .................................................. G06F 13/00
[52] U.S. Cl. .................................................. 710/9; 710/10
[58] Field of Search ........................................... 710/10, 9

[56] References Cited

U.S. PATENT DOCUMENTS

| | | | |
|---|---|---|---|
| 5,729,721 | 3/1998 | Bettelheim et al. | 395/557 |
| 5,751,951 | 5/1998 | Osborne et al. | 395/200.8 |
| 5,778,218 | 7/1998 | Gulick | 710/60 |
| 5,818,948 | 10/1998 | Gulick | 381/77 |
| 5,835,791 | 11/1998 | Goff et al. | 710/62 |
| 5,841,471 | 11/1998 | Endlsey et al. | 348/231 |
| 5,848,293 | 12/1998 | Gentry | 710/5 |
| 5,875,351 | 2/1999 | Riley | 395/842 |
| 5,901,332 | 5/1999 | Gephardt et al. | 710/41 |

OTHER PUBLICATIONS

USB Feature Specification: Shared Endpoints; SystemSoft Corporation, Intel Corporation; pp. i–iii, 1–14; Dec. 4, 1997.
Universal Serial Bus Common Class Specification; SystemSoft Corporation, Intel Corporation; pp. i–v, 1–14; Nov. 4, 1997.
Universal Seril Bus Specification; Compaq, Digital Equipment Corporation, IBM PC Company, Intel, Microsoft, NEC, Northern Telecom; pp. 1–268; Jan. 15, 1996.
8×930Ax, 8×930Hx Users Manual; Intel; pp. 6.1–10.1 Appendix B–D; 1997.
U.S. Application No. 09/003,963, filed Jan. 7, 1998.
U.S. Application No. 09/004,003, filed Jan. 7, 1998.
U.S. Application No. 09/003,897, filed Jan. 7, 1998.
U.S. Application No. 09/004,002, filed Jan. 7, 1998.
U.S. Application No. 09/004,005, filed Jan. 7, 1998.
U.S. Application No. 09/003,925, filed Jan. 7, 1998.

Primary Examiner—Ayaz R. Sheikh
Assistant Examiner—David A. Wiley
Attorney, Agent, or Firm—Limbach & Limbach L.L.P.

[57] ABSTRACT

A method and apparatus for dynamically configuring a USB device. The USB device includes a plurality of mappings for relating a received token to an endpoint pipe. The mappings are configured at initialization, and are dynamically selected during operation of a USB network.

18 Claims, 4 Drawing Sheets

| 7 | 6 | 5 | 4 | 3 | | | 0 | ← 300 |
|---|---|---|---|---|---|---|---|---|
| FAN | | TT | | EN | | | | |

FIGURE 3

| FUNCTION ADDRESS | TOKEN TYPE | ENDPOINT | ENDPOINT PIPE # |
|---|---|---|---|
| FA0 | IN, OUT, SETUP | 0 | 0 |
| FA0 | IN, OUT, SETUP | 1 | 1 |
| FA0 | IN, OUT, SETUP | 2 | 2 |
| FA0 | IN, OUT, SETUP | 3 | 3 |
| FA0 | IN, OUT, SETUP | 4 | 4 |
| FA0 | IN, OUT, SETUP | 5 | 5 |
| FA0 | IN, OUT, SETUP | 6 | 6 |
| FA0 | IN, OUT, SETUP | 7 | 7 |
| FA0 | IN, OUT, SETUP | 8 | 8 |
| FA0 | IN, OUT, SETUP | 9 | 9 |
| FA0 | IN, OUT, SETUP | 10 | 10 |
| FA0 | IN, OUT, SETUP | 11 | 11 |
| FA0 | IN, OUT, SETUP | 12 | 12 |
| FA0 | IN, OUT, SETUP | 13 | 13 |
| FA0 | IN, OUT, SETUP | 14 | 14 |
| FA0 | IN, OUT, SETUP | 15 | 15 |
| NOT APPLICABLE | SOF | NOT APPLICABLE | SOF PIPE |
| NOT FA0 | ANY | NOT APPLICABLE | NONE |

FIGURE 4

| FUNCTION ADDRESS | TOKEN TYPE | ENDPOINT | ENDPOINT PIPE # |
|---|---|---|---|
| FA0 | IN, OUT, SETUP | 0 | 0 |
| FA0 | IN, OUT, SETUP | 8 | 1 |
| FA0 | OUT | 1 | 2 |
| FA0 | IN | 1 | 3 |
| FA0 | OUT | 2 | 4 |
| FA0 | IN | 2 | 5 |
| FA0 | OUT | 3 | 6 |
| FA0 | IN | 3 | 7 |
| FA0 | OUT | 4 | 8 |
| FA0 | IN | 4 | 9 |
| FA0 | OUT | 5 | 10 |
| FA0 | IN | 5 | 11 |
| FA0 | OUT | 6 | 12 |
| FA0 | IN | 6 | 13 |
| FA0 | OUT | 7 | 14 |
| FA0 | IN | 7 | 15 |
| FA0 | SETUP | 1-7 | NONE |
| FA0 | ANY | 9-15 | NONE |
| NOT APPLICABLE | SOF | NOT APPLICABLE | SOF PIPE |
| NOT FA0 | ANY | NOT APPLICABLE | NONE |

APPARATUS AND METHOD FOR TRANSMITTING AND RECEIVING DATA INTO AND OUT OF A UNIVERSAL SERIAL BUS DEVICE

BACKGROUND OF THE INVENTION

1. Field of the Invention

This apparatus and method relates to sending and receiving data over a Universal Serial Bus network and, in particular, to sending and receiving data to and from multiple endpoint pipes.

2. Description of the Related Art

Universal Serial Bus (USB) is a standard peripheral interface for attaching personal computers to a wide variety of devices: e.g., digital telephone lines, monitors, modems, mice, printers, scanners, game controllers, keyboards, and other peripherals. A USB thus replaces existing interfaces such as the RS-232C serial ports, parallel ports, PS/2 interface and game/MIDI ports.

In accordance with USB, all attached devices connect to a personal computer through a single connector type using a tiered-star topology. A host personal computer includes a single USB controller. The host controller provides the interface between the USB network and the host personal computer. The host controller controls all accesses to USB resources and monitors the bus's topology. A USB hub provides USB attachment points for USB devices.

Figure 1:
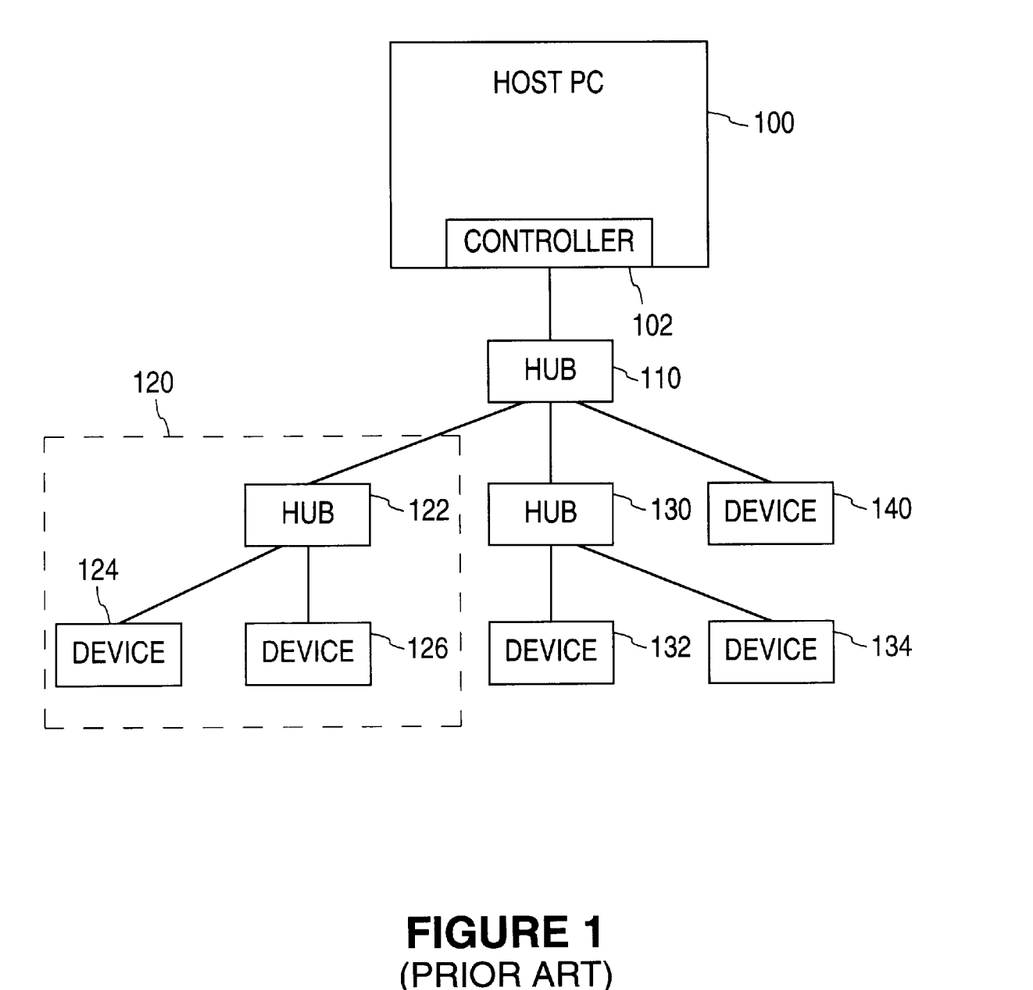
FIG. 1 is a block diagram of a Universal Serial Bus network.

An example of the tiered-star topology of a USB network is shown in FIG. 1. Host PC 100 is a typical personal computer having a USB port connection via host controller 102. Host controller 102 connects directly to root hub 110, which is typically implemented as part of the Host PC 100. Compound device 120, hub 130, and device 140 connect to the host controller 102 through hub 110. Devices 132 and 134 connect to the host controller 102 through hub 130 and through hub 110.

Compound device 120 includes devices 124, 126 and hub 122. Hub 122 of compound device 120 connects to the host controller through hub 110. Devices 124 and 126 of compound device 120 connect to the host controller 102 through hub 122 and through hub 110. A practical example of a compound device would be an integrated printer and fax. The printer could be device 124, and the fax could be device 126.

The tiered-star topography illustrated in FIG. 1 allows data to be transmitted into and out of the host PC 100 to the various devices. When data is transmitted from the host to a device it is transmitted downstream through the interconnecting hubs. When data is transmitted from a device to the host it is transmitted upstream through the interconnecting hubs.

The USB hubs and devices may be connected and disconnected without completely re-starting the USB network. Upon connection of a device or hub to an upstream hub the upstream hub will notify the host controller of a change in status. Following USB protocol, the host controller will enable the port of the hub to which the device is connected. The host controller will then assign a unique functional address to each device. Ports are enabled one at a time as the host controller 102 assigns unique functional addresses. Upon connection of a compound device, the host controller assigns a unique functional address to each device contained within the compound device.

Returning to FIG. 1, devices 124, 126, 132, 134, and 140 will each be assigned a unique functional address upon connection to the USB network. Likewise, hubs 110, 122, and 130 will each be assigned a unique functional addresses and act as USB devices upon connection to the USB network.

A USB Function is a USB device that is able to transmit and receive information on the bus. A Function may have one, or more, configurations, each of which defines the interfaces which make up the device. Each interface, in turn, is made up of one of more endpoints.

An endpoint is the ultimate source, or sink, of data. An endpoint pipe provides for the movement of data between the USB and memory, and completes the path between the USB Host and the function endpoint. A USB device may support up to 16 such endpoint pipes at any given time. Each endpoint pipe will have the same functional address.

At initialization of an endpoint device, the host controller associates a pipe with the endpoint functions. The pipes allow the host controller to move data into and out of a host memory buffer to and from the endpoints. The USB specification implements two types of pipe communication modes: stream and message. Stream data does not have a defined USB structure. Message data does have a defined USB structure.

At initialization, a pipe is assigned a claim on USB bus access and bandwidth usage. This assignment will determine priority for transmitting data over a particular pipe to an endpoint. The endpoint's characteristics are also associated with the pipe at initialization. Such characteristics include maximum data payload sizes, directionality of transfers, and other appropriate characteristic data. These characteristics are used by the host in making data transfers over the pipe.

The assignment of a claim on USB bus access and bandwidth to a pipe allows the host controller to make a best effort to ensure that all input/output data requests to endpoints will be adequately serviced over the available bandwidth of the USB bus. The assignment of claims to bus access and bandwidth to a pipe limits the allocation to later configured devices. Once the bandwidth of a USB bus is completely allocated, subsequently configured devices cannot be allocated bus bandwidth. Consequently the subsequently configured devices cannot be allocated pipes.

Some time after the initialization process completes, the allocation of pipes to particular endpoints of a device is fixed. This can be changed as the requested functionality of the device evolves. Accordingly, devices which include a plurality of endpoint functions will be assigned a plurality of pipes (each associated with a particular endpoint).

Each endpoint is an addressable entity on the USB and is required to respond to IN and OUT tokens from the USB host controller. The IN tokens indicate that the host has requested to receive information from an endpoint, and OUT tokens indicate that the host is about to send information to an endpoint.

On detection of an IN token addressed to an endpoint, the endpoint is responsible for responding with a data packet. If the endpoint is currently stalled, a STALL handshake packet is returned. If the endpoint is enabled, but no data is present, a NAK (Negative Acknowledgement) handshake packet is sent.

Similarly, on detection of an OUT token addressed to an endpoint, the endpoint is responsible for receiving a data packet sent by the host and storing it in a buffer. If the endpoint pipe is currently stalled, at the end of data transmission, a STALL handshake packet is sent. If the endpoint pipe is currently disabled, at the end of the data transmission, no handshake packet is sent. If the endpoint pipe is enabled, but no buffer is present in which to store the data, a NAK (Negative Acknowledgement) handshake packet is sent.

A disabled endpoint, or endpoints not currently mapped to an endpoint pipe do not respond to IN, OUT, or SETUP tokens.

The USB defines four types of data transfers over a pipe: control, bulk, interrupt, and isochronous.

Control transfers are used by the host to configure a device upon attachment to a hub. Control transfers may also be used by the host controller for implementation specific transactions with a device.

Bulk transfers are sequential transfers generally of large amounts of data. Bulk transfers provide reliable transactions by use of error detection and resending corrupted data. The bus bandwidth allocated for a bulk transfer can be whatever is currently available as bulk transfers are not time sensitive.

Interrupt transfers are small spontaneous data transactions emanating from a device.

Isochronous transfers are continuous, real-time data transactions. Isochronous transfers are allocated a dedicated portion of a USB network's bandwidth to ensure timely completion of isochronous transactions.

Although a device may include a plurality of endpoint functions, those endpoint functions may not necessarily operate simultaneously. By way of example, a multi-function device may include a fax and a digital telephone function. During initialization, the multi-function device is assigned a unique functional address and the fax and digital telephone functions are each associated with distinct endpoint numbers. Out pipes for transmitting data to each function are likewise allocated during initialization. One Out pipe is associated with an endpoint number for the fax function, and one Out pipe is associated with an endpoint number for the printer function. A fax and digital telephone will each typically require an isochronous Out pipe because their transactions should operate in real time.

During operation of the multi-function device, the host controller will access only one of the functions at a time. Consequently only one of the Out pipes allocated for the fax and digital telephone functions will be used at any given time.

Where a plurality of devices are connected to a USB bus, the bandwidth resources may not meet the demands of all the devices. Consequently, the assignment of a claim to bus access and bandwidth to both of the fax's out pipe and the digital telephone's out pipe can limit the allocation of resources to subsequently configured devices. This limitation affects subsequent allocations even thought the fax and the digital telephone will not be used simultaneously.

One way to avoid this problem is to configure a device to have a particular personality then, when another personality is required, to reset the device and configure it to have a different personality. For example a multi-function fax and printer device could first be configured to operate as a fax. Later, should the host PC require a printer, the host PC could reset the device to reconfigure the multi-function device to act as a printer. Thus, by resetting a multi-function device, the device can be caused have multiple personalities. The resetting of a multi-function device, however, requires a control transfer to effectuate each personality change.

Alternatively, multiple interfaces can share an endpoint. This may be accomplished by providing an additional layer of software. The USB Fearure Specification describes such an arrangement for sharing an endpoint across multiple interfaces. This arrangement, however, requires software multiplexing, additional fields for endpoint descriptors, and a flow control mechanism.

SUMMARY OF THE INVENTION

It is an object of the invention to provide a mechanism for dynamically changing the personality of a multi-function USB device.

It is an additional object of the invention to dynamically allocate a single pipe to a plurality of functions.

It is a feature of one aspect of the invention to map a single pipe to a plurality of endpoints having the same functional address.

It is another feature of one aspect of the invention to map a single pipe to a plurality of endpoints having different functional addresses.

It is a further feature of the invention to provide a general mechanism to provide a mapping between the endpoint numbers, token types, one or more functional addresses and endpoint pipes.

It is an advantage of one aspect of the invention to map tokens of the same type to particular endpoint.

It is a further advantage to provide efficient gate-level implementations of a device according to the invention.

According to one aspect of the invention, a method for mapping endpoint pipes across multiple logical nodes in a Universal Serial Bus device configures a plurality of endpoints each having an endpoint number and an associated function address; establishes a plurality of endpoint pipes; defines a mapping between the plurality of pipes and the plurality of endpoints; receives a token over a first pipe from the plurality of pipes wherein the token has an endpoint number; and connects the first pipe to a selected endpoint by applying the mapping to the token endpoint number, wherein the endpoint number of the token is different than the endpoint number of the selected endpoint.

According to another aspect of the invention, a method for mapping pipes across multiple logical nodes in a Universal Serial Bus device receives a token having a first endpoint number; and maps the token to an endpoint having a second endpoint number wherein the first endpoint number is different than the second endpoint number.

According to a further aspect of the invention, a method for mapping pipes across multiple logical nodes in a Universal Serial Bus device configures a first endpoint having a first functional address and a first endpoint number; configures a second endpoint having a second functional address and a second endpoint number wherein the second functional address is different from the first functional address; receives a token addressed to the first functional address and first endpoint number; and maps the token to the second endpoint.

According to another aspect of the invention, a Universal Serial Bus device utilizes a plurality of endpoints; a plurality of pipe maps for associating a pipe with an endpoint; and a configuration register for selecting from the plurality of pipe maps.

According to another aspect of the invention, a multi-function USB device includes a first mapping function for mapping received tokens to endpoint pipes, a second mapping function, different from the first mapping function, for mapping received tokens to endpoint pipes, and a configuration register having a plurality of states wherein at least one of the states selects the first mapping function and at least one of the states selects the second mapping function.

A method for dynamically changing the personality of the device initializes the device to define a first personality implementing the first mapping function and a second personality implementing the second mapping function; sets the configuration register in a first state to select the first personality; and sets the configuration register in a second state to select the personality.

These and other objects, features, and advantages will become apparent when considered with reference to the following description and the accompanying drawings.

DETAILED DESCRIPTION OF THE PREFERRED EMBODIMENTS

The invention described in this application is an aspect of a larger set of inventions described in the following co-pending applications which are commonly owned by the assignee of the present invention, and are hereby incorporated by reference: U.S. patent application Ser. No. 09/003, 963, filed Jan. 7, 1998, entitled "Apparatus and Method for Implementing a Versatile USB Endpoint Pipe" (attorney docket no. NSC1-D2400); U.S. patent application Ser. No. 09/00,003, filed Jan. 7, 1998, entitled "Apparatus and Method of Implementing a USB Endpoint Pipe with Double Buffering Support" (attorney docket no. NSC1-D2500); U.S. patent application Ser. No. 09/003,897, filed Jan. 7, 1998, entitled "Apparatus and Method of Transmitting and Receiving USB Isochronous Data" (attorney docket no. NSC1-D2700); U.S. patent application Ser. No. 09/004,002, filed Jan. 7, 1998, entitled "An Apparatus and Method for Handling Universal Serial Bus Control Transfers" (attorney docket no. NSC1-D2800); U.S. patent application Ser. No. 09/004,005, filed Jan. 7, 1998, entitled "An Apparatus and Method for Providing an Interface to a Compound Universal Serial Bus Controller" (attorney docket no. NSC1-D2900); U.S. patent application Ser. No. 09/003,925, filed Jan. 7, 1998, entitled "An Apparatus and Method for Initializing a Universal Serial Bus Device" (attorney docket no. NSC1-D3000).

Figure 7:
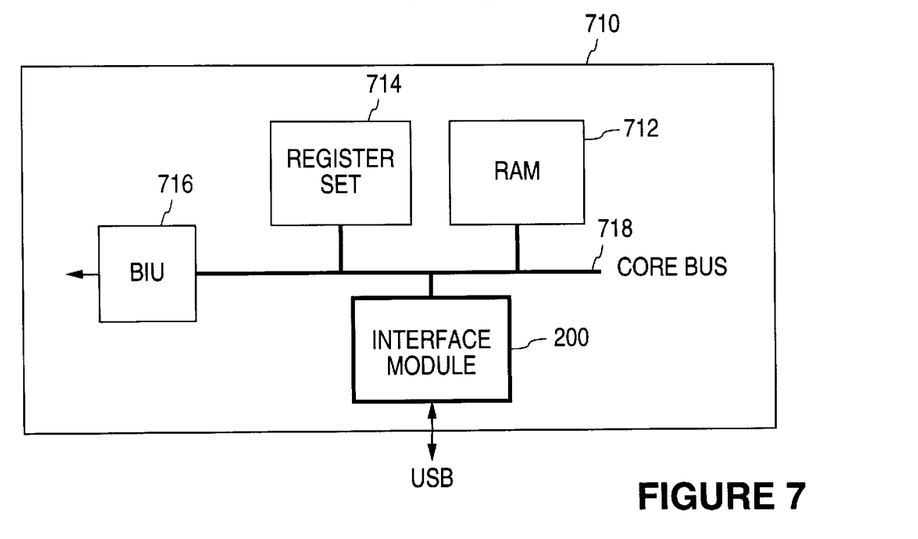
FIG. 7 is a block diagram of a preferred embodiment of a USB device including the interface module of FIG. 2.

With reference now to FIG. 7, a USB device 710 in accordance with the invention is described. The preferred embodiment of the device meets Revision 1.0 of the USB Specification and provides a number of advantages. The USB device 710 includes a USB interface module 200, a register set 714, a RAM 712, and a Bus Interface Unit (BIU) 716.

The interface module 200 connects to a USB network to send and receive data. The interface module 200 also connects to register set 714, RAM 712, and BIU 716 via a core bus 718. The core bus 718 allows the interface module 200 to access the register set 714 and the RAM 712. The BIU 716 provides access to the core bus 718 address space.

Figure 2:
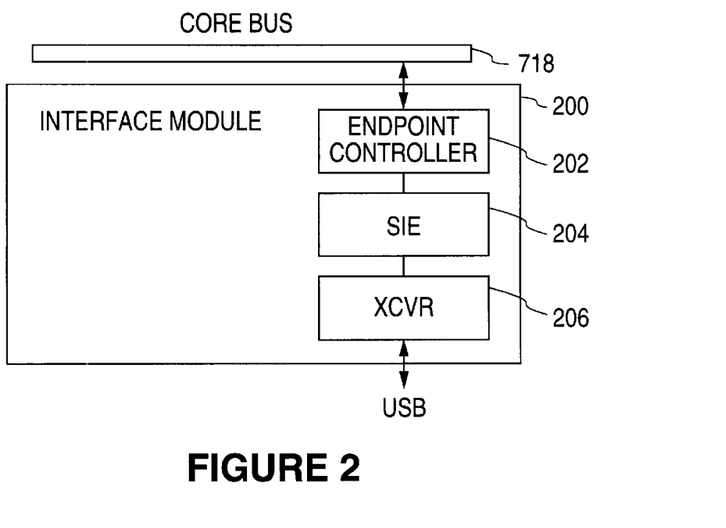
FIG. 2 is a block diagram of one preferred embodiment of an interface module for a Universal Serial Bus device.

Turning now to FIG. 2, the USB interface module 200 of FIG. 7 is described. The USB Interface Module 200 provides the interface for the USB device 710 to connect to a USB network. The interface module 200 includes an integrated USB transceiver 206, a serial interface engine (SIE) 204, and the endpoint controller 202.

The transceiver 206 provides the physical interface with a USB network. The transceiver includes both drivers and receivers which comply with the physical layer specifications of Revision 1.0 of the USB Specification.

The serial interface engine 204 is operationally coupled with the transceiver 206 and is comprised of a physical (PHY) and a media access control (MAC) level. The physical level includes a digital-clock recovery circuit, a digital glitch filter, an End_Of_Packet detection circuit, and a bit-stuffing and de-stuffing logic circuit.

The medium access control level includes packet formatting, cyclic redundancy check generation and checking, endpoint address detection, and provides the necessary control to give the NAK, ACK and STALL responses as determined by the end-point controller 202 for the specified endpoint pipe. The serial interface engine 204 is also responsible for detecting and reporting USB-specific events such as Reset, Suspend and Resume.

The endpoint controller 202 is operationally coupled with the serial interface engine 204 and provides the interface for USB function endpoints.

The endpoint controller 202 operates as a master and slave on the core bus 718 and supports all the USB endpoint classes: control, bulk, isochronous and interrupt. Slave access is used to access internal control registers of the register set 714, and master access is used to transfer data between endpoints and a RAM 712.

Figure 6:
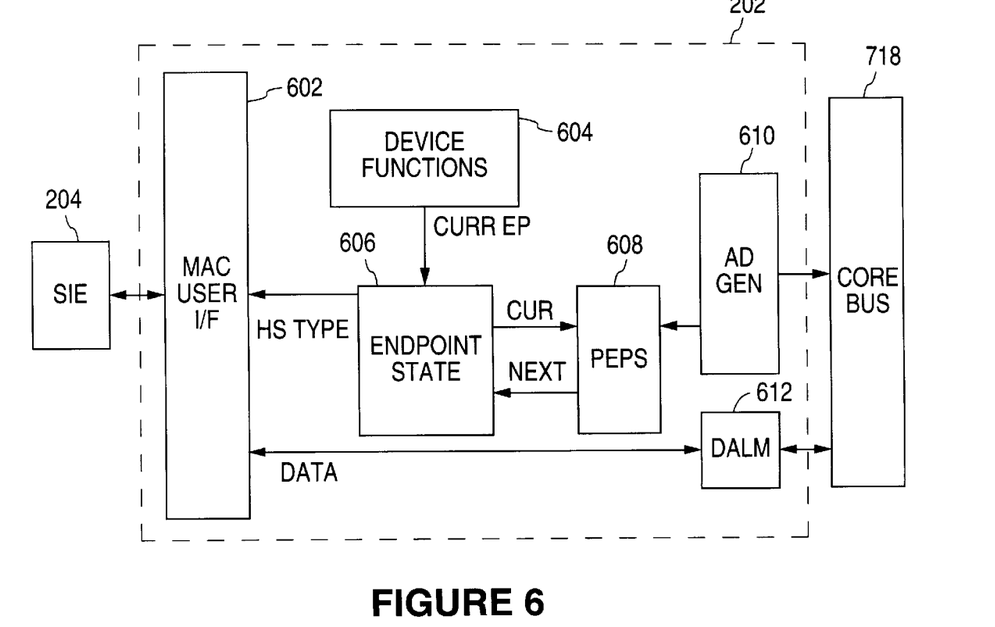
FIG. 6 is a block diagram of a preferred embodiment of the endpoint controller of FIG. 2.

The endpoint controller 202 maintains separate state information for each endpoint pipe. State information required for immediate decisions, such as responding with a NAK or STALL handshake, is kept within the endpoint controller 202 at all times for each endpoint pipe. This information is used to direct the medium access control layer of the serial interface engine 204 to give the proper ACK, NAK, and STALL responses. Other information necessary for endpoint operation is kept in an endpoint array of the RAM 712. The endpoint controller 202 also includes an endpoint state machine 606. Since only one endpoint pipe is active at any given time, the endpoint pipe state machine 606 is shared among all endpoint pipes.

For IN tokens, the endpoint controller 202 is responsible for transferring data from a selected buffer to the host. For OUT tokens, the endpoint controller 202 is responsible for transferring data from the host to a selected buffer. To allow more flexibility when assigning buffers to an endpoint pipe, a double buffering scheme is permitted on each endpoint pipe. This allows the endpoint controller 202 to provide a prompt response to all transactions without resorting to NAKs.

The endpoint controller 202 provides a mapping from the functional address, token type (IN, OUT, Setup), and endpoint number to one of the endpoint pipes. A preferred embodiment supports two fixed mappings to endpoint pipes. The selection of this mapping is controlled by the setting of endpoint pipe map select bits of a device configuration register which is located in the control register 714. The host controller 102 may control the setting of the pipe map select bits.

Figure 3:
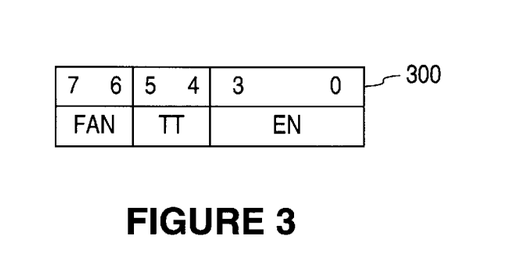
FIG. 3 is a diagram of a pipe map index of a preferred embodiment.

The endpoint controller 202 uses a token packet to generate a byte-wide pipe map index 300 which is shown in FIG. 3. Bits 0–3 of the pipe map index 900 are used to identify the endpoint number (EN). Bits 4–5 are used to identify the token type where 00 indicates an OUT token, 10 indicates an IN token, 11 indicates a SETUP token, and 01 indicates a SOF token. Bits 6–7 are used to indicate the selected functional address.

Upon receipt of a token packet, the endpoint controller 202 generates the pipe map index 300. The endpoint controller 202 then accesses the endpoint pipe map select bits to select the appropriate mapping for the token.

Figure 4:
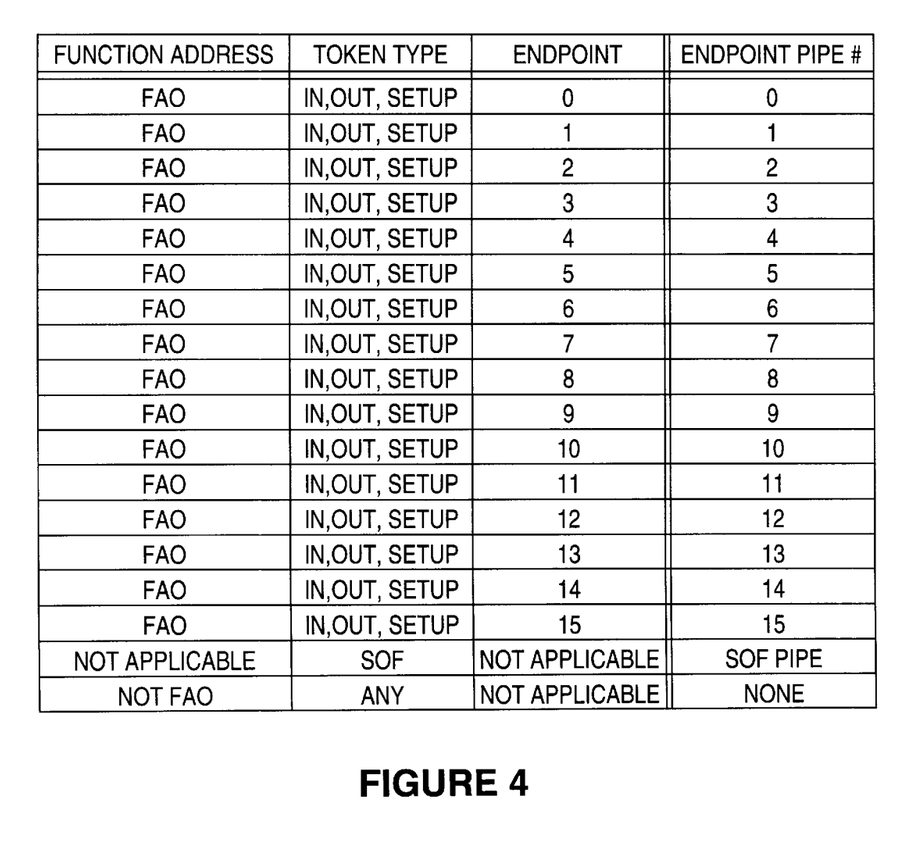
FIG. 4 is a table showing an example mapping implemented by a preferred embodiment of an endpoint controller.

One preferred embodiment of the USB device 710 supports two mappings. Accordingly, the endpoint pipe select bits comprise a single bit. A mapping for when the endpoint pipe map select bit is zero is shown in FIG. 4. A mapping for when the endpoint pipe map select bit is one is shown in FIG. 5.

By changing the endpoint pipe select bit, the host controller 102 can change the mapping of endpoint pipes across functions. Thus, the host controller 102 is able to configure a device to have multiple personalities. The host controller 102 may then dynamically change the devices personality simply by accessing the endpoint pipe map select bits. This further allows the host controller 102 to allocate endpoint pipes across functional address, token type and endpoint to where the endpoint pipes are most needed as a resource.

Turning first to FIG. 4, the endpoint mapping is direct according to the token packet's functional address and endpoint number. Designator FA0 represents the functional address assigned to the device 710 during initialization. As shown, a token packet having Function Address FA0, Token Types IN, OUT or SETUP, and Endpoint 0 are mapped to Endpoint Pipe #0. Similarly, a token packet having Function Address FA0, Token Types IN, OUT or SETUP, and Endpoint 1–15 are mapped to Endpoint Pipe #1–15, respective to Endpoint Number. A token packet having a SOF token is automatically mapped to a SOF Endpoint Pipe. A token packet having a Function Address other than FA0 is ignored.

Figure 5:
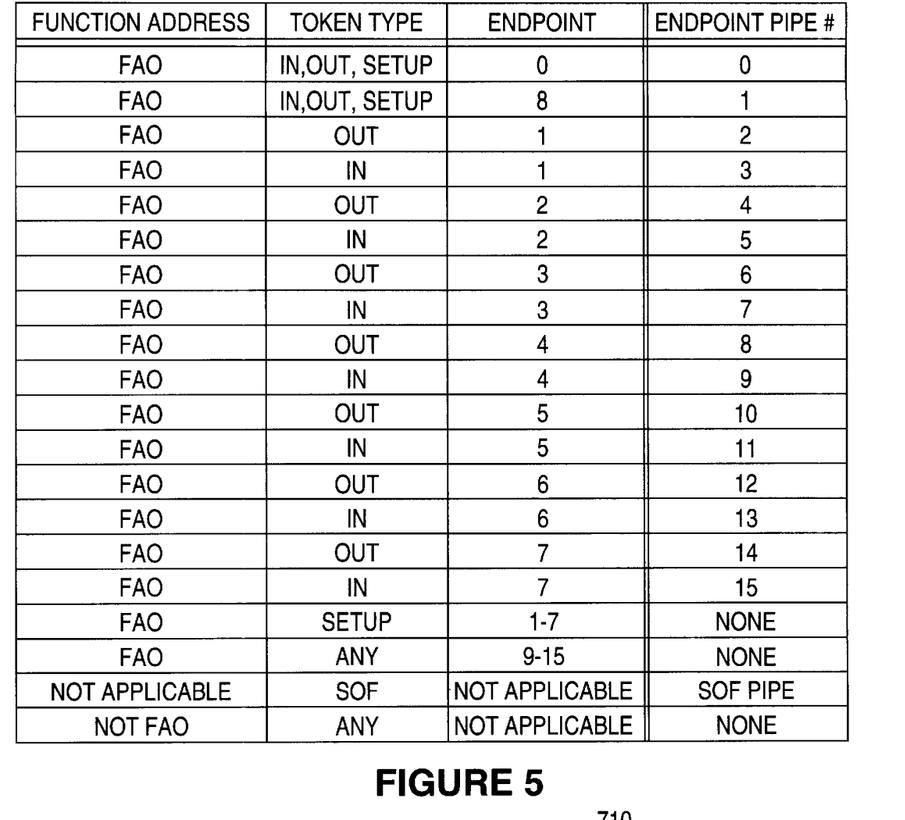
FIG. 5 is a table showing another example mapping implemented by a preferred embodiment of an endpoint controller.

Turning now to FIG. 5, the mapping, for when the endpoint pipe map bit is set, will be described. Token packets having Functional Address FA0, Token Types IN, OUT, or SETUP, and Endpoint 0 are mapped to Endpoint Pipe #0. Token packets having Functional Address FA0, Token Types IN, OUT, or SETUP, and Endpoint 8 are mapped to Endpoint Pipe #1. Token packets having Functional Address FA0, Token Type OUT and Endpoint 1 are mapped to Endpoint Pipe #2. Token packets having Functional Address FA0, Token Type IN and Endpoint 1 are mapped to Endpoint Pipe #3. Token packets having Functional Address FA0, Token Type OUT and Endpoint 2 are mapped to Endpoint Pipe #4. Token packets having Functional Address FA0, Token Type IN and Endpoint 2 are mapped to Endpoint Pipe #5. Token packets having Functional Address FA0, Token Type OUT and Endpoint 3 are mapped to Endpoint Pipe #6. Token packets having Functional Address FA0, Token Type IN and Endpoint 3 are mapped to Endpoint Pipe #7. Token packets having Functional Address FA0, Token Type OUT and Endpoint 4 are mapped to Endpoint Pipe #8. Token packets having Functional Address FA0, Token Type IN and Endpoint 4 are mapped to Endpoint Pipe #9. Token packets having Functional Address FA0, Token Type OUT and Endpoint 5 are mapped to Endpoint Pipe #10. Token packets having Functional Address FA0, Token Type IN and Endpoint 5 are mapped to Endpoint Pipe #11. Token packets having Functional Address FA0, Token Type OUT and Endpoint 6 are mapped to Endpoint Pipe #12. Token packets having Functional Address FA0, Token Type IN and Endpoint 6 are mapped to Endpoint Pipe #13. Token packets having Functional Address FA0, Token Type OUT and Endpoint 7 are mapped to Endpoint Pipe #14. Token packets having Functional Address FA0, Token Type IN and Endpoint 7 are mapped to Endpoint Pipe #15. Token packets having Functional Address FA0, Token Type SETUP and Endpoint 1–7 are not mapped to an Endpoint Pipe. Token packets having Functional Address FA0, any Token Type and Endpoint 9–15 are not mapped to an Endpoint Pipe. Token packets having Token Type SOF are mapped to a SOF Endpoint Pipe. Token packets having any Functional Address other than FA0 are not mapped to an Endpoint Pipe.

This mapping allows allocation of the first eight endpoint numbers for both IN and OUT operations. Accordingly, the endpoint pipes can be used for either input or output, but not both simultaneously. With this mapping you can therefore have an endpoint 1 IN and and endpoint 1 OUT.

Although the endpoint mapping of FIG. 4 and 5 shows only FA0, mappings for a compound device will include additional functional addresses. The preferred embodiment allocates two bits of the pipe map index 900 to functional address so that four functional addresses may be supported. A preferred embodiment of such a device maps all control functions together onto one endpoint pipe. This reduces the overall number of required endpoint pipes.

In a preferred embodiment of a programming model, the endpoint pipes may be mapped across functional addresses, token type, and endpoint numbers. This avoids reconfiguration of the device and allows a completely dynamic allocation of the endpoint pipes among the functional addresses based on the requirements of the active applications. Moreover, a plurality of mappings may be dynamically programmed in a data register. These mappings may in turn be dynamically selected by an index register.

All information used by endpoint pipes during data transfers is maintained in an endpoint array located in RAM 812. This array is indexed, by endpoint pipe, from a base address which is defined in an endpoint array base address register located in the register set 814. This array contains control words for each endpoint. The control words contain command and status information for the associated endpoint pipe, such as a pointer to the beginning of a related buffer, the size of the buffer, the state of the buffer and other relevant parameters.

The buffer state defines if the buffer is to be used for input or output transactions, and whether it is currently being accessed or has completed the desired operation.

When an IN or OUT transfer is requested, the endpoint controller 202 first maps the token to the appropriate endpoint pipe. When the token is mapped to an endpoint pipe with a buffer present, the endpoint controller 202 reads the appropriate control word. This control word tells the endpoint controller 202 how to complete the transaction. At the end of a transaction, the endpoint controller writes the control word with status which is used by software as an indication to release this buffer, and provide a new one.

The endpoint controller 202 minimizes the number of memory accesses required to process a transaction. Only on reception of a token is a memory access required to access the endpoint array. This access reads the location and size information for the data transfer. The data transfer occurs in successive double-word read or write operations.

The endpoint controller 202 of the interface module 200 has the highest priority on the core bus 718 for transfers, and the transfer rate is significantly higher than that of USB. Thus, there is a minimal requirement for data buffering within the endpoint controller 202, aside from an extra word to overlap subsequent accesses with a current one. A byte counter keeps track of the number of bytes that are transferred. The last access of a transfer may require a partial read or write of memory. The partial write of the last access is determined by the final byte count. At the end of a transfer, the current control word is written with status for the transfer, and the other control word for this endpoint is read to check to see if another buffer was prepared. After the control word operations, the endpoint pipe state is updated in the endpoint pipe sate array. This completes the processing of a transaction by the endpoint controller 202 of the interface module 200.

Turning now to FIG. 6, the structure of the endpoint controller 202 will be described in greater detail. The endpoint controller 202 is comprised of several functional blocks. Specifically, the endpoint controller 202 includes a medium access control interface 602, a device functions block 604, an endpoint state machine 606, a partial endpoint pipe storage (PEPS) 608, an address generator 610, and a data alignment multiplexor 612.

The medium access control interface 602 is coupled with the endpoint state machine 606 and the data alignment mux 612 to provide the interface to the medium access control level of the serial interface engine 204. Some domains of the endpoint controller 202 operate using a clock on the core bus 718, other domains operate using a local clock of the endpoint controller 202. The medium access control interface 602 synchronizes data bytes between the various domains with an asynchronous handshake for each byte transferred out of the endpoint controller 202.

The device function block 604 performs device functions such as address checking and generation. The device function block 604 is operationally coupled to the endpoint state machine 606 to provide such information in relation to the currently accessed endpoint pipe.

The endpoint state machine 606 performs the functions relating to maintaining the state of an active endpoint pipe. The state machine 606 maintains the state of an active endpoint pipe with well-defined transitions to synchronize hardware and software interactions. The current state is visible to a host controller via an endpoint state register.

The partial endpoint pipe storage 608 holds a minimal amount of information for each endpoint pipe. The remainder is stored in an array in local RAM.

The address generator 610 creates the address for transfer on the core bus. Typically the address is a memory address.

The data alignment mux 612 provides the necessary data byte alignments before transfer over the core bus 718.

Although the embodiments described herein are with reference to specific mappings, the present invention can be applied with a variety of other mapping functions without departing from the scope of the invention. This includes programmable mappings by writing locations as determined by the UIR. Those having ordinary skill in the art will certainly understand from the embodiments disclosed herein that many modifications are possible without departing from the teachings hereof. All such modifications are intended to be encompassed within the following claims.

What is claimed is:

1. A method for mapping endpoint pipes across multiple logical nodes in a Universal Serial Bus device comprising the steps of:

configuring a plurality of endpoints each having an endpoint number and an associated function address, establishing a plurality of endpoint pipes, defining a mapping, within a Universal Serial Bus device, between the plurality of endpoint pipes and the plurality of endpoints, receiving a token over a first pipe from the plurality of pipes wherein the token has an endpoint number, and connecting the first pipe to a selected endpoint by applying the mapping to the token endpoint number, wherein the endpoint number of the token is different than the endpoint number of the selected endpoint.

2. The method of claim 1 wherein the mapping associates a plurality of endpoint pipes with a single endpoint.

3. A method for mapping endpoint pipes across multiple logical nodes in a Universal Serial Bus device comprising the steps of:

configuring a plurality of endpoints each having an endpoint number and an associated function address, establishing a plurality of endpoint pipes, defining a mapping between the plurality of endpoint pipes and the plurality of endpoints, and between a token type and the plurality of endpoints, receiving a token over a first pipe from the plurality of pipes wherein the token has an endpoint number, and a token type, and connecting the first pipe to a selected endpoint by applying the mapping to the token endpoint number and the type data wherein the endpoint number of the token is different than the endpoint number of the selected endpoint.

4. The method of claim 3 wherein the mapping associates a plurality of token types with a single endpoint pipe.

5. A method for mapping endpoint pipes across multiple logical nodes in a Universal Serial Bus device comprising the steps of:

configuring a plurality of endpoints each having an endpoint number and an associated function address, wherein the plurality of endpoints comprises a first endpoint having a first functional address and a second endpoint having a second functional address wherein the first functional address is different than the second functional address, establishing a plurality of endpoint pipes, defining a mapping between the plurality of endpoint pipes and the plurality of endpoints and between a functional address and the plurality of endpoints, receiving a token over a first pipe from the plurality of pipes wherein the token has an endpoint number, wherein the received token has functional address data, and connecting the first pipe to a selected endpoint by applying the mapping to the token endpoint number and to the functional address data wherein the endpoint number of the token is different than the endpoint number of the selected endpoint.

6. A method for mapping endpoint pipes across multiple logical nodes in a Universal Serial Bus device comprising the steps of:

configuring a plurality of endpoints each having an endpoint number and an associated function address, establishing a plurality of endpoint pipes, defining a first mapping and a second mapping between the plurality of endpoint pipes and the plurality of endpoints, selecting between the first and second mapping functions, receiving a token over a first pipe from the plurality of pipes wherein the token has an endpoint number, and connecting the first pipe to a selected endpoint by applying the mapping to the token endpoint number, wherein the endpoint number of the token is different than the endpoint number of the selected endpoint.

7. A method for mapping pipes across multiple logical nodes in a Universal Serial Bus device comprising the steps of:

receiving a token having a first endpoint number, and mapping the token to an endpoint having a second endpoint number wherein the first endpoint number is different than the second endpoint number, wherein the mapping occurs within a Universal Serial Bus device.

8. The method of claim 7 further comprising the steps of:

receiving a token having a third endpoint number, and mapping the token to the endpoint having the second endpoint number wherein the first, second, and third endpoint numbers are all different.

9. A method for mapping pipes across multiple logical nodes in a Universal Serial Bus device comprising the steps of:

configuring a first endpoint having a first functional address and a first endpoint number, configuring a second endpoint having a second functional address and a second endpoint number wherein the second functional address is different from the first functional address, receiving a token addressed to the first functional address and first endpoint number, and mapping, within a Universal Serial Bus device, the token to the second endpoint.

10. A method for mapping pipes across multiple logical nodes in a Universal Serial Bus device comprising the steps of:

configuring a first endpoint having a first functional address and a first endpoint number, configuring a second endpoint having a second functional address and a second endpoint number wherein the second functional address is different from the first functional address, receiving a token addressed to the first functional address and first endpoint number, wherein the token defines a control function, and mapping the token to the second endpoint.

11. The method of claim 9 wherein the first endpoint number is the same as the second endpoint number.

12. A Universal Serial Bus device comprising:

a plurality of endpoints, a plurality of pipe maps for associating a pipe with an endpoint, and a configuration register, within a Universal Serial Bus device, for selecting from the plurality of pipe maps.

13. The device of claim 12 wherein the plurality of endpoints have a plurality of functional addresses.

14. The device of claim 13 wherein the plurality of pipe maps associate a plurality of pipes with a single endpoint.

15. A Universal Serial Bus device comprising:

a plurality of endpoints, a plurality of pipe maps for associating a pipe with an endpoint, wherein the plurality of pipe maps associates a pipe to an endpoint based on a functional address, a token type and an endpoint number, and a configuration register for selecting from the plurality of pipe maps.

16. The device of claim 15 wherein a first endpoint number and a first token type are mapped to a first endpoint, and the first endpoint number and a second token type are mapped to a second endpoint.

17. A Universal Serial Bus device comprising:

a plurality of endpoints, a plurality of pipe maps for associating a pipe with an endpoint, and a configuration register for selecting from the plurality of pipe maps wherein the configuration register may be set by a host computer connected to the Universal Serial Bus device.

18. A method for dynamically changing the personality of a multi-function USB device wherein the device includes a first mapping function for mapping received tokens to endpoint pipes, a second mapping function, different from the first mapping function, for mapping received tokens to endpoint pipes, and a configuration register having a plurality of states wherein at least one of the states selects the first mapping function and at least one of the states selects the second mapping function, the method comprising the steps of:

initializing a USB device to define a first personality implementing the first mapping function and a second personality implementing the second mapping function, setting the configuration register in a first state to select the first personality, and setting the configuration register in a second state to select the personality.

* * * * *